United States Patent [19]
Chew et al.

[11] Patent Number: 5,152,136
[45] Date of Patent: Oct. 6, 1992

[54] SOLID FUEL DUCTED ROCKET WITH GEL-OXIDIZER AUGMENTATION PROPULSION

[75] Inventors: William M. Chew; Leo K. Asaoka; Jay S. Lilley; Douglas L. May, all of Huntsville, Ala.

[73] Assignee: The United States of America as represented by the Secretary of the Army, Washington, D.C.

[21] Appl. No.: 741,296

[22] Filed: Aug. 5, 1991

[51] Int. Cl.$^5$ .......................... F02K 7/08; F02K 9/00; F02K 9/28
[52] U.S. Cl. ........................................ 60/251; 60/252; 60/253; 60/270.1
[58] Field of Search .................. 60/251, 252, 253, 245, 60/270.1

[56] References Cited

U.S. PATENT DOCUMENTS

| | | | |
|---|---|---|---|
| 3,138,929 | 6/1964 | Schatz | 60/252 |
| 3,173,252 | 3/1965 | Ziegenhagen | 60/252 |
| 3,802,192 | 4/1974 | Curran | 60/253 |
| 3,807,169 | 4/1974 | Bradford | 60/270.1 |
| 4,050,243 | 9/1977 | Holzman et al. | 60/245 |
| 4,391,094 | 7/1983 | Engel et al. | 60/245 |

FOREIGN PATENT DOCUMENTS 0131845 8/1982 Japan ................................ 60/2245

Primary Examiner—Richard A. Bertsch
Assistant Examiner—Howard R. Richman
Attorney, Agent, or Firm—Freddie M. Bush; Hugh P. Nicholson

[57] ABSTRACT

A propulsion system is disclosed comprising a glycidyl azide polymer (GAP) solid fuel generator (SFGG) that produces fuel-rich hot gases which are combusted in a combustion zone of a combustion chamber of a solid fuel ducted rocket. A basic embodiment comprises an airbreathing engine wherein a ducted member scoops air in from the atmosphere for hypergolic reaction with the fuel-rich hot gases for propulsion during a sustain stage of a flight. An augmentation of the basic embodiment is achieved by combusting the fuel-rich GAP SFGG effluent with inhibited red fuming nitric acid (IRFNA) gel oxidizer to produce higher thrust during the boost and dash stages of a flight. During the high thrust stages, the air ducts of the ducted member are closed and IRFNA gel is injected into the combustion chamber to react with the fuel-rich hot gases from the GAP SFGG. The resulting higher pressure in the combustion chamber gives the missile a correspondingly greater thrust than during the lower pressure airbreathing sustain stage of flight.

3 Claims, 2 Drawing Sheets

SOLID FUEL DUCTED ROCKET WITH GEL-OXIDIZER AUGMENTATION PROPULSION

DEDICATORY CLAUSE

The invention described herein may be manufactured, used, and licensed by or for the Government for governmental purposes without the payment to us of any royalties thereon.

CROSS-REFERENCE TO RELATED APPLICATION

This application relates to copending and commonly assigned invention and application for patent, Ser. No. 07/662,851, filed Mar. 1, 1991, titled: "Gel/Solid Bipropellant Propulsion System With Energy Management Capabilitity", now U.S. Pat. No. 5,133,183.

BACKGROUND OF THE INVENTION

The Army is developing propulsion systems to supplement the solid and liquid propulsion systems currently in the field. Airbreathing propulsion has an advantage over solid or bipropellant rockets in that it uses air as the oxidizer and does not have to carry any oxidizer on board; therefore, airbreathing systems offer either longer range or smaller volume. The disadvantage is that the combustion pressures are lower, which prevent airbreathing systems from delivering higher thrust for critical parts of a mission, such as boost and the dash to the target.

Additionally, the Army desires all propulsion systems to have minimum signature exhaust and to meet current Department of Defense (DOD) Insensitive Munitions (IM) Guidelines under Military Standard 2105A.

Conventional ducted rocket solid gas generators containing metal fuels develop high specific impulse when their effluent gases are combusted with air; however, the smoky exhaust gases contain solid particulates that form a smoke trail that does not meet minimum signature properties, which is a requirement for most future Army missile systems. A liquid hydrazine gas generator, which requires a heavy catalyst bed, has lower performance than the smoky solid fuel gas generator. A combination of minimum smoke and high performance is a preferred combination.

An object of this invention is to provide a solid fuel ducted rocket with the capability of increased and variable thrust for the boost and final, or dash, phases of the mission. To accomplish this, this invention contains two key elements:

a) a method to close the air duct and allow higher pressure operation of the combustion chamber that increases net specific impulse; and, b) The availability of an alternate, high energy gelled oxidizer that combusts with the same fuel gas from the ducted rocket solid fuel gas generator to produce the higher specific impulse (thrust per propellant mass flow rate) required for the boost and dash mission phases.

SUMMARY OF THE INVENTION

A propulsion system comprised of a glycidyl azide polymer (GAP) solid fuel gas generator (SFGG) that produces fuel-rich gases which are combusted in the combustion chamber in a ducted rocket is augmented with gel-oxidizer. A capability to combust the fuel-rich GAP SFGG effluent with inhibited red fuming nitric acid (IRFNA) gel oxidizer, which produces higher thrust during the boost and dash stages of a rocket motor in flight, is employed to yield a correspondingly greater thrust than the lower pressure airbreathing sustain stage. The GAP solid fuel gas generator (SFGG) composition is prepared from a glycidyl azide diol and/or triol polymerized with a di- or tri functional isocyanate such as isophorone diisocyanate or hexamethyl diisocyanate. No other components are required for the solid gas generator, although other polymers, plasticizer, or fuel additives may be added to give better physical or improved density or performance characteristics.

DESCRIPTION OF THE PREFERRED EMBODIMENT

The propulsion system of this invention comprises a glycidyl azide polymer (GAP) solid fuel generator (SFGG) that produces fuel-rich gases which are combusted with air or IRFNA gel in a combustion chamber to produce gases of minimum smoke which are exhausted through exhaust nozzle to produce thrust.

Figure 1:
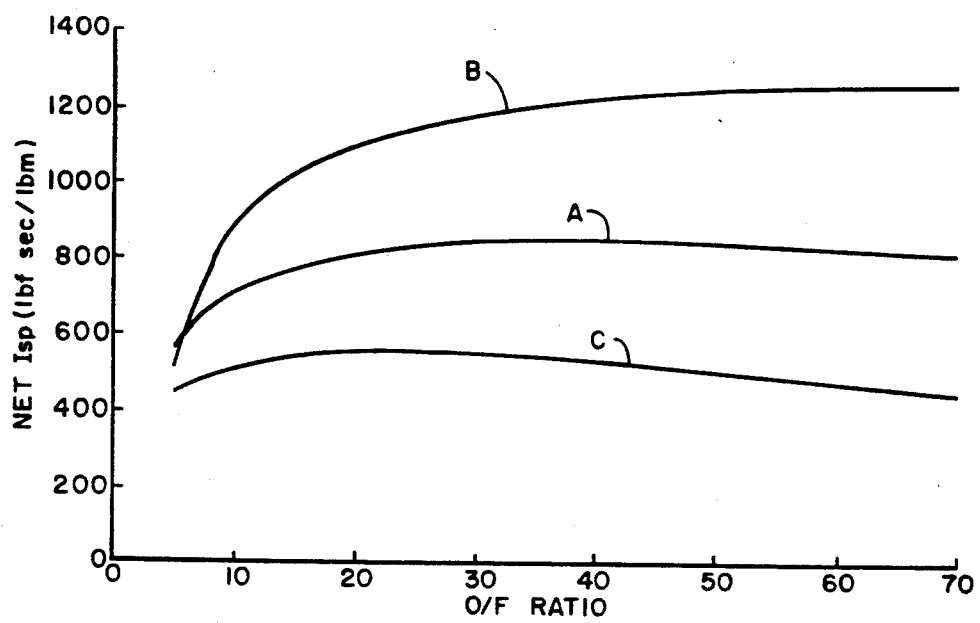
FIG. 1 compares net specific impulse at various oxidizer to fuel ratios for ducted rockets with a conventional solid gas generator (smoky), a liquid gas generator (minimum smoke), and a GAP solid fuel gas generator (minimum smoke).

In reference to FIG. 1, the predicted performance of a GAP SFGG, Curve A, is compared to the performances from a conventional smoky SFGG, Curve B, and liquid hydrazine blend, which is decomposed over a catalyst bed, Curve C. Both the GAP SFGG and the liquid hydrazine blend are classified as producing minimum smoke. The hydrazine blend is comprised of hydrazine, hydrazine nitrate, and water in ratios 68%/20%/12% respectively.

Figure 2:
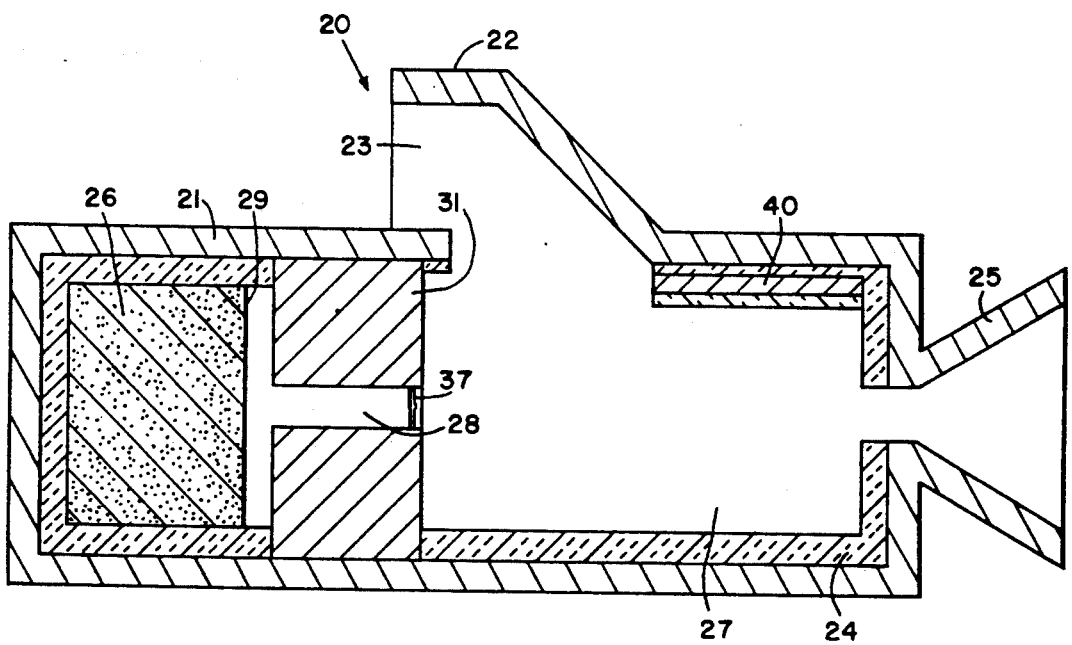
FIG. 2 depicts a ducted rocket containing a glycidyl azide polymer solid fuel gas generator (GAP SFGG) that produces fuel-rich gases which are combusted with air in the combustion chamber and exhausted through a rocket nozzle to provide thrust.

FIG. 2 depicts a ducted rocket 20 which comprises a rocket motor case 21 having a ducted member 22 with an air inlet 23 for airbreathing function of system 20. Fuel insulator 24 is installed on the internal surface of the rocket motor case. An exhaust nozzle 25 is shown at the aft end of the airbreathing system. An intake closure 40 can be closed during initial boost phase (by an external boost source not shown) to decrease drag effect up to the point where the airbreathing function is employed, at which time, the intake closure is opened as further described hereinbelow for the structures of FIGS. 2 and 3. A GAP SFGG 26 is shown positioned in the head-end of rocket motor. After being ignited by any well known igniter means 29 (including electrical leads to a power source, not shown), the GAP SFGG supplies extremely fuel-rich hot gases (circa 2000° F.) through conduits 28 for further combustion reaction in combustion zone of combustion chamber 27 with the air which is scooped in through the air inlet 23 of the ducted member 22. The conduits are defined by a housing or containment structure 31. The fuel insulator 24 performs a dual functions as the name implies, i.e., fuel and insulator. The fuel insulator contributes gaseous products for the combustion chamber reaction while protecting the rocket motor case by its insulation function at the same time.

Figure 3:
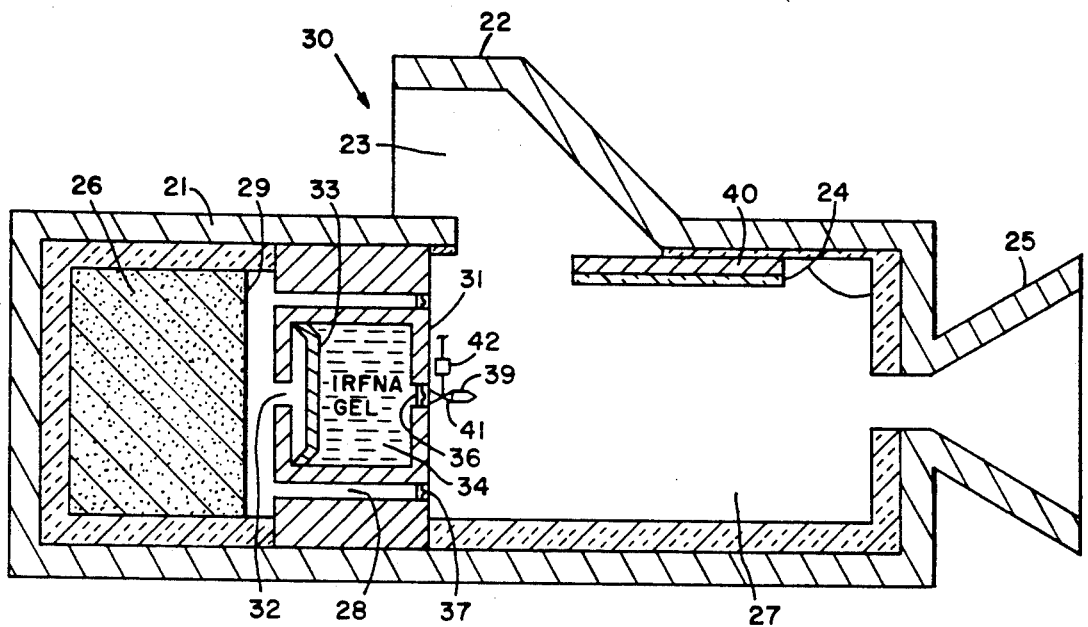
FIG. 3 depicts an augmented ducted rocket similar to the ducted rocket of FIG. 2 but additionally having the capability to combust the fuel-rich GAP SFGG effluent with inhibited red fuming nitric acid (IRFNA) gel oxidizer by hypergolic reaction.

A solid fuel ducted rocket augmented with gel-oxidizer is depicted as system 30 of FIG. 3. Besides the capability to combust the solid fuel generator gases with air as in system 20 of FIG. 2, system 30 of FIG. 3 additionally comprises a capability to combust the fuel-rich GAP SFGG effluent with inhibited red fuming nitric acid (IRFNA) gel oxidizer to produce higher thrust during the boost and dash stages of a flight. Like numbers of FIG. 2 are employed in FIG. 3 to identify common elements 21, 22, 23, 24, 25, 26, 29, 28, 27, and 40 as depicted in FIG. 2 which comprise a rocket motor case, a ducted member, air inlet, fuel-insulator, an exhaust nozzle, GAP SFGG, igniter means, conduits for fuel rich hot gases, a combustion zone, combustion chamber, and an intake closure, respectively. FIG. 3 depicts an IRFNA GEL system having a housing 31 or containment structure for containing IRFNA GEL which is hypergolic with fuel-rich hot gases generated from the GAP SFGG. The IRFNA must be separated from the fuel-rich hot gases generated by the GAP SFGG after the GAP SFGG is ignited by any well known ignition means until the hypergolic reaction is desired. In further reference to the IRFNA GEL depicted in FIG. 3 and the description of its use to produce higher thrust during the boost and dash stages of a flight, the following sequences of events take place:

1. Intake closure 40 is closed since the pressure to sustain hypergolic combustion of fuel-rich hot gases with IRNA GEL requires that the air inlet be closed. The functions of closing and opening of the intake closure are well established in the art. These functions can be programmed through system controller 45 or other well established flight control means.

2. High pressure burst disk(s) 37 are ruptured after the GAP SFGG is ignited by igniter 29 and fuel-rich hot gases exert a predetermined pressure value, (e.g., 1,000 psig), and the fuel rich hot gases are discharged through conduits 28 to combustion zone 27 for hypergolic reaction with air scooped in through air inlet 23 during air breathing sustain stage of flight. Once the GAP SFGG is ignited and the burst disks are ruptured, the fuel-rich gases continue to flow into the combustion zone 27 for hypergolic reaction with air or gel-oxidizer. The boost or dash stage employing gel-oxidizer requires additional changes noted under 3 below.

3. Intake closure 40 is closed which stops air breathing function and substantially, instantaneously, the system controller initiates control action to valve control 42 to open valve 41 which causes the pressure in chamber 32 and on diaphragm 33 to expel IRFNA gel through ruptured burst disk 36 and subsequently through injector 39 and into combustion zone 27 for hypergolic action in a pressurized combustion chamber with fuel-rich hot gases to produce higher pressure (e.g. 1000-4000 psia) gases for exhausting through exhaust nozzle 25 to produce greater thrust than the thrust produced during the lower pressure (e.g., 50-75 psia) airbreathing sustain stage of flight.

4. When the higher pressure hypergolic reaction for boost or dash stage is no longer desired or required; closing of valve 41 terminates expelling of IRFNA GEL and opening intake closure 40 resumes airbreathing function to combust the fuel-rich hot gases which continued to flow through conducts 28.

5. If additional sustain operation is desired following termination of boost or dash stage; intake closure 40 is reopened to resume air scoop function for a continued sustain stage by air intake through air inlet 23, and the hypergolic reaction between oxygen of the air and fuel-rich hot gases, which is uninterrupted from SG SFGG, are again combustion in combustion zone 27 with scooped in oxygen of the air as the oxidizer. The combustion zone is a zone in the combustion chamber wherein oxidizer and fuel are brought together for hypergolic reaction. The oxidizer in the airbreathing propulsion stage is oxygen whereas the oxidizer in the gel oxidizer augmentation propulsion phase is inhibited red fuming nitric acid gel (IRFNA gel).

In further reference to FIG. 2 of the Drawing depicting a ducted rocket or airbreathing system 20, the preferred solid gas generator comprises a cured glycidyl azide polymer 26 (GAP) shown positioned in the head end of rocket motor case 21. GAP gas generator composition is prepared from a glycidyl azide diol and/or triol polymerized with di- or tri- functional isocyanate such as isophorone diisocyanate or hexamethyl diisocyanate. No other components are required for the solid gas generator, although other polymers, plasticizer, or fuel additives may be added to give better physical or improved density or performance characteristics.

The glycidyl axide polymer (GAP) has a high pressure exponent that can be exploited to control the burning rate of GAP fuel through a variable flow injector for the solid gas generator (SGG). An ignitor system is not required in the combustion chambers because the SGG combustion gases undergo a hypergolic reaction with either the oxygen in air or inhibited red fuming nitric acid gel (IRFNA GEL) which is stored in the storage container.

Figure 4:
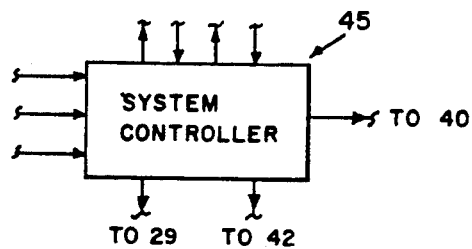
FIG. 4 depicts a system controller 45 remotely located to illustrate functions (e.g., controls to valves, to igniter, and controls to intake closure).

To place the ducted rocket system 20 in operation, an igniter 29 (with electrical leads connected to a power source not shown) which is controlled by system controller 45 (shown in an abbreviated sketch of FIG. 4) ignites the GAP based SFGG 26. The fuel-rich hot gases are discharged through conduits 28 to combustion zone 27 for combustion with oxygen of the air scooped through air inlet 23.

The following descriptions center around the system controller 45 and its control of the augmented ducted rocket propulsion system 30 with respect to the IRFNA GEL 34 injection into the combustion zone 27. The system controller 45 receives input signal from the guidance and control system through signal transmission means when the boost or dash stage is to be implemented with the use of the IRFNA GEL system. In FIG. 3, control means 42 causes valve 41 to open which causes flow of IRFNA gel through burst disk 36 from pressure already on diaphragm 33 by fuel-rich hot gases in chamber 32. Rupturing of disk 36 permits the IRFNA gel to be injected through burst disk 36 and subsequently through injector 39. The closing of intake closure 40 and the sequence of placing the IRFNA gel system in operation should occur substantially at the same time since the higher pressure of fuel-rich hot gases and IRFNA gel hypergolic reaction requires that the air scoop function through air inlet 23 be terminated to avoid pressure loss of the combustion gases during a boost stage or dash stage of flight.

The system controller, as disclosed in the commonly assigned and copending application referenced hereinabove, operates in a more limited but similar capacity in opening and closing valves in response to guidance and control instructions. The power supply, sensors, and control means which function with the system/controller include those elements for power supply, sensors, and control means which may be selected from well known prior art sources for functional compatibility with the system controller and its functions performed in the augmented ducted rocket propulsion system.

Thus, the system controller requires a power or energy source which must be compatible with the control means employed to achieve a desired response time. For example, a control means which is a solenoid system has a longer response time for opening and closing valves and would require an electrical energy source. A hydraulic energy source which yields a shorter response time requires a control fluid, control fluid reservoir, and an electrical control fluid valve. The system controller can be made operable or activated by remote means included within design parameters of a selected guidance and control system employed such as infrared, electronic beam or electromagnetic wave systems including radar, radio, and television. Thus, the system controller can be linked to a ground guidance and control (G&C) system through signal processors or to a G&C system of the parent vehicle from which the augmented ducted rocket propulsion system is ejected or launched, or to aircraft G&C system exercising control, or to on board sensors which can achieve operational compatibility with combination of G&C systems for activating the system controller which performs the required functions needed in controlling the augmented ducted rocket propulsion system during a boost and dash phase of operation.

We claim:

1. A solid fuel ducted rocket augmented with gel-oxidizer comprising:
   (i) a rocket motor case having a head-end and an aft end;
   (ii) an exhaust nozzle secured to said rocket motor case at the aft-end thereof;
   (iii) a combustion zone of a combustion chamber within said rocket motor case and in communication with said exhaust nozzle, said combustion zone being a zone in the combustion chamber wherein fuel and oxidizer are brought together for hypergolic reaction;
   (iv) a glycidyl azide polymer solid fuel gas generator installed within said rocket motor case at the head-end thereof, said glycidyl azide polymer after being ignited performing the function of supplying fuel-rich hot gases for further combustion within said rocket motor case in a combustion zone of a combustion chamber;
   (v) an igniter for igniting said glycidyl azide polymer;
   (vi) a ducted member extending outwardly from said rocket motor case between said aft-end and said head-end thereof and forming an air scoop having an air inlet for directing air scooped from the atmosphere during a low pressure airbreathing sustain stage of a flight into the interior of said rocket motor case for combustion of said fuel-rich hot gases in a combustion zone of a combustion chamber;
   (vii) a moveable intake closure mounted within said combustion chamber, said intake closure capable of being opened during a sustain stage of flight to allow air to be scooped into said combustion chamber and said intake closure capable of being closed during a boost or dash stage of flight to minimize drag and to retain higher combustion pressure within said combustion chamber, as compared with said sustain stage of flight, employing said gel-oxidizer for hypergolic reaction with said fuel-rich hot gases;
   (viii) a housing structure in a spaced apart relationship from said glycidyl azide polymer within said rocket motor case and extending toward the aft-end of said rocket motor case, said housing structure in said spaced apart relationship defining a combustion zone and one or more conduits for conducting fuel-rich hot gases into said combustion zone for hypergolic reaction with air scooped in during a lower pressure airbreathing sustain stage of propulsion and said housing structure having a storage capability for storing a gel-oxidizer and means for expelling said gel-oxidizer for hypergolic reaction with said fuel-rich hot gases at a much higher pressure during a boost or dash stage of a flight as compared with said sustain stage of a flight;
   (ix) a combustion zone of a combustion chamber within said rocket motor case defined by an outer surface of housing structure extending toward said aft-end of said rocket motor case, said combustion zone being a zone of a combustion chamber for hypergolic reaction during said sustain, boost, and dash stages of flight with said fuel-rich hot gases, to produce combustion gases for exhausting through said exhaust nozzle to produce thrust; and,
   (x) a fuel insulation layer installed on an internal surface of said rocket motor case, said fuel insulating layer performing a dual function of insulating said rocket motor case and supplying gaseous combustible products for combustion within said combustion zone of said combustion chamber.

2. The solid fuel ducted rocket augmented with gel-oxidizer as defined in claim 1 wherein said one or more conduits for said fuel-rich hot gases additionally comprise a high pressure burst disk installed in each of said conduits which after being ruptured by pressure exerted by said fuel-rich hot gases allows said fuel-rich hot gases to be discharged into said combustion zone.

3. The solid fuel ducted rocket augmented with gel-oxidizer as defined in claim 2 wherein said housing structure contains a gel-oxidizer of inhibited red fuming nitric acid and wherein said means for expelling said gel-oxidizer comprises a valve control for opening valve means to achieve flow of said gel-oxidizer through said burst disk which ruptures in response to pressure by said gel-oxidizer, said pressure by said gel-oxidizer in response to pressure exerted by said fuel-rich hot gases in an expulsion diaphragm to subsequently expel said gel-oxidizer through an injector into said combustion zone, said combustion zone of a combustion chamber having said intake closure that is in a closed position to thereby achieve hypergolic reaction between said fuel-rich hot gases and said gel-oxidizer to produce a higher combustion zone pressure and higher thrust values during a boost or dash stage of a flight as compared with said sustain stage of flight.

* * * * *